March 3, 1942.   W. H. HUGGINS   2,274,791
GOGGLES
Filed May 13, 1940
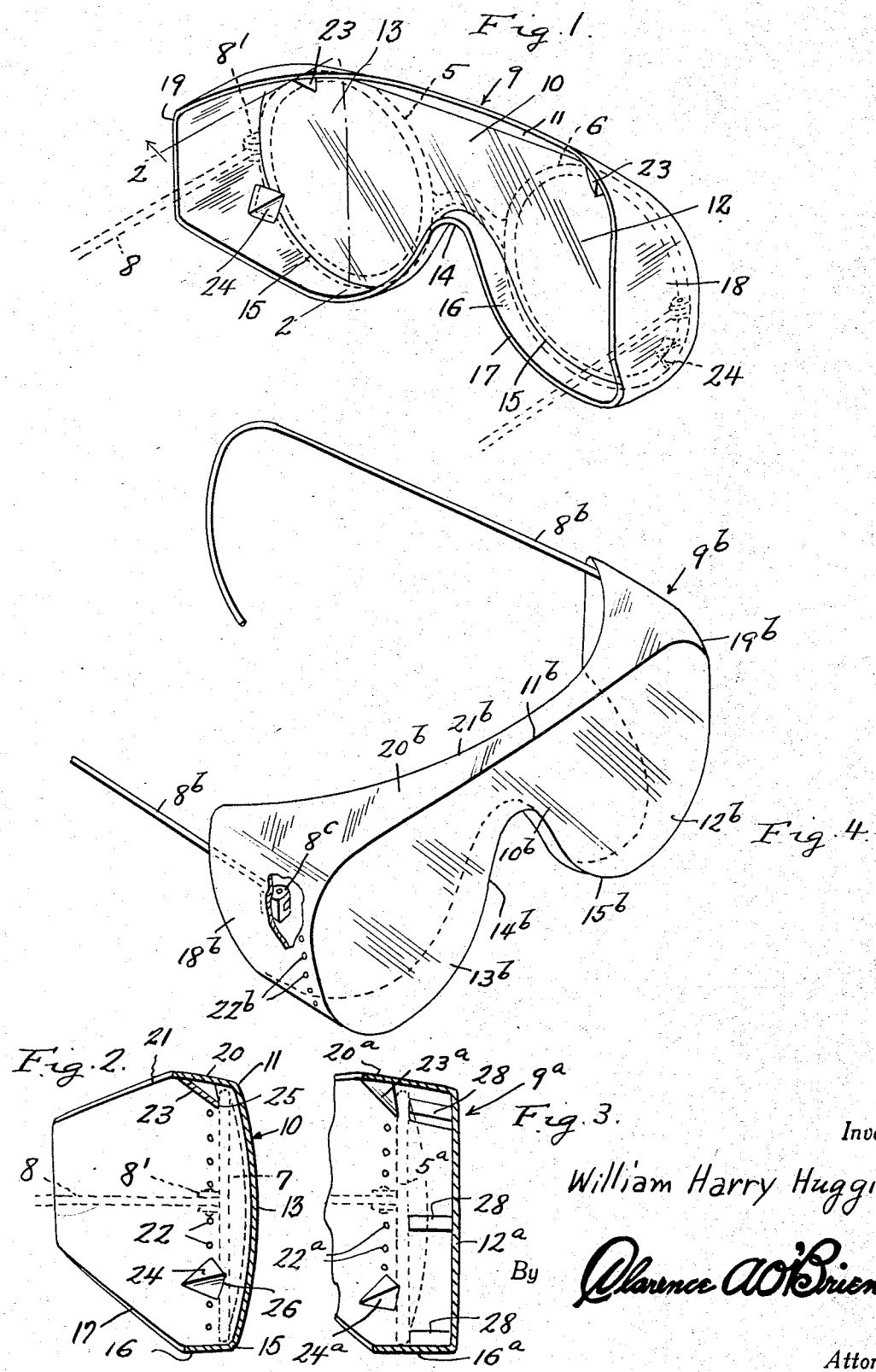
Inventor
William Harry Huggins
By Clarence A. O'Brien
Attorney Patented Mar. 3, 1942

2,274,791

UNITED STATES PATENT OFFICE 2,274,791

GOGGLES

William Harry Huggins, Janesville, Wis.

Application May 13, 1940, Serial No. 334,879

4 Claims. (Cl. 2—14)

My invention relates to improvements in safety goggles, and particularly the type of such goggles which substantially entirely enclose and protect the brow and temples and a portion of the nose of the wearer around the eyes, and the primary object of the invention is to provide arrangements of this character in simple and efficient form which can be provided in an attractive embodiment at comparatively low cost, and whose essential form is adaptable either for use as an attachment for eyeglasses or spectacles, or as goggles to be used without reference to eyeglasses or spectacles.

Other important objects and advantages of my invention will be apparent from a reading of the following description taken in connection with the drawing, wherein for purposes of illustration I have shown preferred embodiments of my invention.

In the drawing:

Figure 1 is a rear perspective view of an embodiment of the invention exhibiting goggles in the form of an attachment for eyeglasses or spectacles and showing connection thereof with spectacles exhibited in dotted lines.

Figure 2 is a transverse vertical sectional view taken through Figure 1 approximately on the line 2—2 and looking toward the left in the direction of the arrows.

Figure 3 is a fragmentary transverse vertical sectional view similar to Figure 2 but taken through another embodiment of the invention showing a heavy duty safety attachment adapted to fit rimmed or rimless convex lens eyeglasses or spectacles.

Figure 4 is a fragmentary front perspective view of an embodiment of the invention in the form of goggles to be worn without reference to eyeglasses or spectacles.

Referring in detail to the drawing, and first to Figures 1 and 2 thereof, showing an embodiment of the invention in the form of an attachment for ordinary convex spectacles or eyeglasses comprising lens frames 5 and 6, respectively, with forwardly convexed lenses 7 mounted therein, and with side pieces 8 hinged between pairs of ears 8' on the laterally outward sides of the lens frames. The attachment is generally designated by the numeral 9 and is composed of a translucent, noninflammable material hollow body, preferably molded from suitable material, and providing the concavo-convex front wall 10 which has a substantially straight upper edge 11 and substantially semi-circular lens portions 12 and 13, respectively, which are defined by an inverted V-shaped opening 14 between these lens portions of a size, height and contour to snugly accommodate the nose and adjacent portions of the face of the wearer. Extending rearwardly from the lower convoluted edge 15 of the front wall 10 is the bottom wall 16 which substantially follows the contour of the convoluted lower edge 15 and is of varying width to have its rear edge 17 conformably contact the face of the wearer at the opposite sides of the nose and below the eyes of the wearer and upper portions of the nose and sides of the nose of the wearer. The opposite ends of the bottom wall 15 terminate in respective side walls 18 and 19 which reach sufficiently rearwardly to pass the sides of the temples of the wearer and engage portions of the face forwardly of the upper part of the ears of the wearer, these side walls terminating curvedly into the respective opposite ends of the top wall 20 which has a rear edge 21 which is curved to conform to the curvature of the forehead and eyebrow region of the wearer, all of the rearwardly positioned edges described being located and arranged and shaped to fit the face of the wearer in such a manner as to exclude dust, smoke, light, and other material calculated to injure the sight or impair the vision of the wearer. Ventilation holes 22 perforate the side walls 18 and 19 in a vertical arrangement adjacent each of the lens portions 12 and 13.

V-shaped cross section lugs 23 and 24 are attached in pairs to the junction of the side and top walls and adjacent the junction of the side walls and the bottom wall, the side walls of these hollow lugs being tapered so as to position them at an angle to present projecting points 25 and 26, respectively, to engage and reach tightly around the rear sides of the lens frames 5 and 6 of the spectacles or eyeglasses at sufficiently circumferentially spaced intervals to grip and hold the lens frames in place against the lens portions 12 and 13 of the attachment 9, with the side pieces 8 extending along the side walls 18 and 19 to engage over the ears of the wearer in the usual way.

Referring now to Figure 3 of the drawing showing a heavy duty safety attachment for rimmed or rimless eyeglasses or spectacles with convex lenses, as in lens frames 5a. The lugs 23a and 24a corresponding to the lugs described above are present for holding the lens frames in place, but in this case the front edge and the front surfaces of the lens frames engage blocks 28 distributed at suitable circumferential intervals around the side wall and adjacent the junctions of the side walls with the top and bottom walls so that the lens frame 5a is rearwardly spaced from the lens portion 12a so that the lens portion 12a has flex when struck as by flying metal, without striking the eyeglass or spectacle lens or its rim. In all other respects the construction of this particular embodiment of the invention is similar to that shown and described in connection with Figures 1 and 2 of the drawing.

Referring now to Figure 4 of the drawing, showing goggles for wearing without reference to eyeglasses or spectacles, the structure of the first two described embodiments obtains with the exception that in the embodiment of Figure 4 the lugs for holding the lens frames in place are absent as well as the blocks 28 and the lens portions 12b and 13b are optionally concavo-convex or flat. Temple pieces 8b in the present embodiment are provided and attached to pairs of ears 8c fixed on the inner surfaces of the side walls 18c and 19c, respectively, with the temple pieces lying along the inner surfaces of the side walls as clearly shown in Figure 4.

It will be obvious that with any embodiment of the present invention vision is not limited in any direction while the same is in place on the face of the wearer, but that at the same time the eye region of the wearer is completely protected without inconvenience or burdensome contact.

Although I have shown and described herein preferred embodiments of my invention, it is to be definitely understood that I do not desire to limit the application of the invention thereto, except as may be required by the scope of the subjoined claims.

Having described the invention, what is claimed as new is:

1. In goggles of the character described, a hollow translucent body comprising a front wall formed in its lower part with a nose accommodating opening dividing said front wall into two lens portions, a bottom wall extending rearwardly from and substantially following the contour of the lower edge of said front wall, a substantially straight top wall extending rearwardly from the upper edge of said front wall, opposite side walls extending between the adjacent ends of said top and bottom walls, in combination with spectacles including lenses positioned in registry with said lens portions, lugs mounted on the interior of said body behind said lens portions and engaging the rear side of said lenses and holding the lenses in place.

2. In goggles of the character described, a hollow translucent body comprising a front wall formed in its lower part with a nose accommodating opening dividing said front wall into two lens portions, a bottom wall extending rearwardly from and substantially following the contour of the lower edge of said front wall, a substantially straight top wall extending rearwardly from the upper end of said front wall, opposite side walls extending between the adjacent ends of said top and bottom walls, in combination with spectacles including lenses positioned in registry with said lens portions, lugs mounted on the interior of said body behind said lens portions and engaging the rear side of said lenses and holding the lenses in place, said lenses having temples extending rearwardly therefrom and lying along the inner surfaces of said side walls so as to space said side walls from subjacent areas of the face of the wearer.

3. In goggles of the character described, a hollow translucent body comprising a front wall formed in its lower part with a nose accommodating opening dividing said front wall into two lens portions, a bottom wall extending rearwardly from and substantially following the contour of the lower edge of said front wall, a substantially straight top wall extending rearwardly from the upper end of said front wall, opposite side walls extending between the adjacent ends of said top and bottom walls, in combination with spectacles including lenses positioned in registry with said lens portions, lugs mounted on the interior of said body behind said lens portions and engaging the rear side of said lenses and holding the lenses in place, said lenses being forwardly convexed and said lens portions of said body being conformably concavo-convexed to conformably accept the lenses.

4. In goggles of the character described, a hollow translucent body comprising a front wall formed in its lower part with a nose accommodating opening dividing said front wall into two lens portions, a bottom wall extending rearwardly from and substantially following the contour of the lower edge of said front wall, a substantially straight top wall extending rearwardly from the upper end of said front wall, opposite side walls extending between the adjacent ends of said top and bottom walls, in combination with spectacles including lenses positioned in registry with said lens portions, lugs mounted on the interior of said body behind said lens portions and engaging the rear side of said lenses and holding the lenses in place, spacer blocks on the interior of said body forwardly of said lenses and spacing said lenses rearwardly from said lens portions.

WILLIAM H. HUGGINS.